J. A. HAGERMAN.
EDGE TRIMMER.
APPLICATION FILED JULY 6, 1909.
968,654.
Patented Aug. 30, 1910.
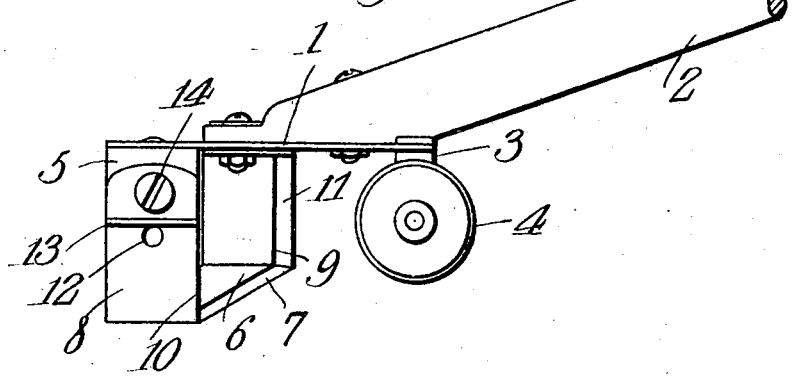
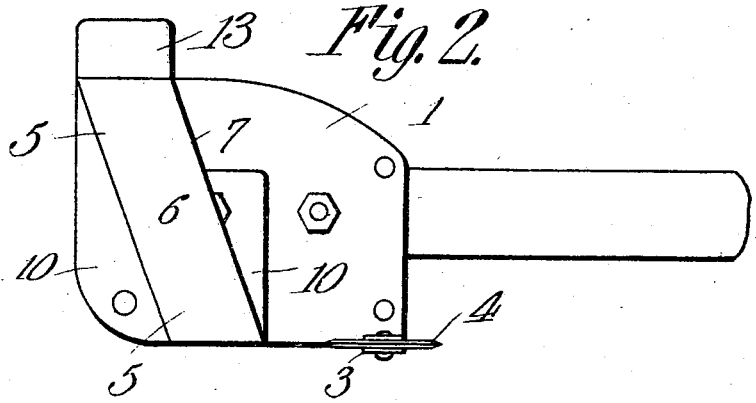
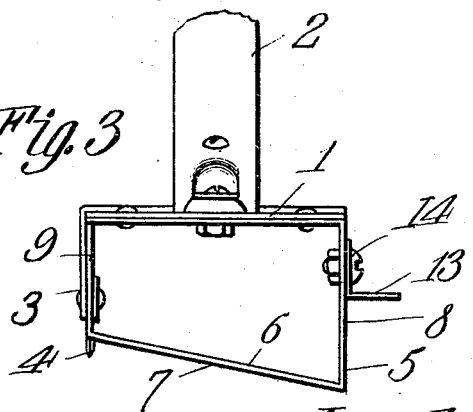
Witnesses
Inventor
Joseph A. Hagerman,
By C. A. Snow & Co.
Attorneys

UNITED STATES PATENT OFFICE.

JOSEPH A. HAGERMAN, OF FINDLAY, OHIO.

EDGE-TRIMMER.

968,654.  Specification of Letters Patent.  Patented Aug. 30, 1910.

Application filed July 6, 1909. Serial No. 506,200.

*To all whom it may concern:*

Be it known that I, JOSEPH A. HAGERMAN, a citizen of the United States, residing at Findlay, in the county of Hancock and State of Ohio, have invented a new and useful Edge-Trimmer, of which the following is a specification.

This invention has relation to edge trimmers for lawns, and it consists in the novel construction and arrangement of its parts, as hereinafter shown and described.

The object of the invention is to provide a simple and an effective implement adapted to be used in the hand for trimming the sod and soil at the edges of lawns and adjacent copings of brick, cement, or other material.

With the above object in view the trimmer includes a frame to which is attached a handle, and which is provided at one side with a depending lug. A cutter or colter wheel is adjustably attached to said lug and a knife of peculiar configuration is affixed to the said frame. The said knife has the general form of a spiral, and is provided at its forward portion with cutting edges, two of which are vertical, while a third is inclined with relation to a horizontal plane, and is also inclined with relation to the long dimension of the handle.

In the accompanying drawings:—Figure 1 is a side elevation of the lawn trimmer. Fig. 2 is an under plan view of the same. Fig. 3 is an end elevation of the same.

The edge trimmer comprises a frame 1, to which is attached a handle 2. The handle is pitched at an angle to the plane of the top of the frame 1. The frame 1 is provided at one side with a depending lug 3, to which is journaled a cutter or colter 4. A blade 5 is attached at its ends to the frame 1, and has the general configuration of a spiral, except that its end portions are disposed at an angle to its side portions, which in turn are also disposed at angles to an intermediate connecting portion. The angles at which the side portions are disposed with relation to the intermediate portions, is other than a right angle. That is to say, the said intermediate portion is at an angle to a horizontal, and the plane of the back of the frame 1. The said blade therefore comprises an intermediate portion 6 having a cutting edge 7, the vertical side portions 8 and 9 having cutting edges 10 and 11 respectively. The side portions 8 and 9 merge into end portions, which are secured directly to the under side of the frame 1.

As will be seen by reference to Fig. 2 of the drawings, the end portions 10 do not aline one with the other, but overlap each other in a plane parallel with the plane of the back of the frame 1. The side portion 8 of the blade 5, is provided with a series of perforations 12 (one of which series is illustrated in Fig. 1 of the drawings,) and a guide lug 13 is secured to the side portion 8 by means of a bolt or similar securing device, which passes transversely through the shank portion of the said lug, and one of the perforations 12. The side portion 9 of the blade 5 lies in the same vertical plane as that in which the colter 4 lies.

In operation the implement is used as follows:—Inasmuch as the implement is especially designed to be used for trimming the edge of a lawn adjacent a walk or coping, the lug 13 is positioned upon the side portion 8 of the blade 5, so that the intermediate portion 6 of the said blade will cut into the ground at a desired depth adjacent the coping or walk. The operator draws the implement along the walk or coping with the lug 13 resting upon the upper surface of the walk or coping, and, consequently, the vertical sides 8 and 9 will cut into the soil adjacent the walk or coping, and the intermediate portion 6 of the blade 5 will cut a slanting bottom in the furrow formed between the walls in the soil made by the incisions of the side portions 8 and 9. As the implement is drawn along the edge of the walk as indicated the colter 4 will sever the roots of the vegetation constituting the sod in advance of the cutting edge of the side portion 9 of the blade 5, and thus the edge of the lawn is neatly trimmed adjacent the walk or coping, and a gutter or furrow of regular configuration is left between the edge of the lawn and the side of the walk.

What is claimed is:—

An edge trimmer comprising a frame, a blade attached to the frame and having side portions approximately at right angles to the plane of the frame, said side portions having straight cutting edges one of which is located in advance of the other, the blade having an intermediate portion lying in a plane at an angle to the plane of the frame, said intermediate portion having a straight cutting edge extending from the cutting edge of one of the side portions to the cutting edge of the other side portion.

In testimony that I claim the foregoing as my own, I have hereto affixed my signature in the presence of two witnesses.

JOSEPH A. HAGERMAN.

Witnesses:
C. W. CANFIELD,
J. L. BABLER.